US012468056B1

(12) United States Patent
Mahmoud

(10) Patent No.: US 12,468,056 B1
(45) Date of Patent: Nov. 11, 2025

(54) EXTRAPOLATION OF SEISMIC LAND STREAMER DATA USING INTERFEROMETRY

(71) Applicant: KING FAHD UNIVERSITY OF PETROLEUM AND MINERALS, Dhahran (SA)

(72) Inventor: Sherif Mohamed Hanafy Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/199,512

(22) Filed: May 6, 2025

(51) Int. Cl.
*G01V 1/36* (2006.01)
*G01V 1/00* (2006.01)
*G01V 1/24* (2006.01)

(52) U.S. Cl.
CPC .............. *G01V 1/005* (2013.01); *G01V 1/247* (2013.01); *G01V 1/366* (2013.01)

(58) Field of Classification Search
CPC ......... G01V 1/005; G01V 1/247; G01V 1/366
See application file for complete search history.

(56) References Cited

U.S. PATENT DOCUMENTS

| | | | | |
|---|---|---|---|---|
| 10,520,622 | B2 * | 12/2019 | Chiffot | G01V 1/362 |
| 2005/0249039 | A1 * | 11/2005 | Miller | G01V 1/16 |
| | | | | 367/177 |
| 2007/0064532 | A1 * | 3/2007 | Haldorsen | G01V 1/42 |
| | | | | 367/57 |
| 2013/0261976 | A1 | 10/2013 | Alshuhail et al. | |
| 2014/0188395 | A1 * | 7/2014 | Poole | G01V 1/364 |
| | | | | 702/17 |
| 2016/0377751 | A1 * | 12/2016 | De Meersman | G01V 1/364 |
| | | | | 702/16 |

FOREIGN PATENT DOCUMENTS

| | | |
|---|---|---|
| CN | 111538081 A | 8/2020 |
| WO | 2021/137704 A1 | 7/2021 |

OTHER PUBLICATIONS

Diego F. Barrera, et al., "Interferometric redatuming by deconvolution and correlation-based focusing", Geophysics, vol. 86, No. 1, Jan. 27, 2021, pp. Q1-Q13.

* cited by examiner

*Primary Examiner* — Krystine E Breier
(74) *Attorney, Agent, or Firm* — Oblon, McClelland, Maier & Neustadt, L.L.P.

(57) ABSTRACT

A system, and method for utilizing an interferometric technique to extrapolate land streamer data. The technique involves a two-step process. In the first step, the recorded traces are correlated to generate virtual traces. Virtual traces that share the same ray path are stacked together, to enhance the signal-to-noise ratio (SNR). In the second step, the generated virtual traces are convolved with the recorded traces to produce new super-virtual traces characterized by longer ray paths than any of the recorded data. These new traces represent source-receiver pairs that were not initially recorded and possess source-receiver offsets larger than all the recorded traces. Subsequently, the traces sharing the same ray path are stacked together to further improve the SNR of the final virtual traces.

18 Claims, 15 Drawing Sheets

Step 1: Cross-correlation and Stacking to Generate the Virtual Traces

Step 2: Convolution and Stacking to Generate the Super Virtual Traces

EXTRAPOLATION OF SEISMIC LAND STREAMER DATA USING INTERFEROMETRY

STATEMENT OF ACKNOWLEDGEMENT

The support provided by the Deanship of Scientific Research (DSR) at King Fahd University of Petroleum & Minerals (KFUPM), Dhahran, Saudi Arabia, is gratefully acknowledged.

BACKGROUND

Technical Field

The present disclosure is directed to a method and system for extrapolation of seismic land streamer data using interferometry.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Seismic data is generated and recorded to image and characterize subsurface features, such as geological formations, hydrocarbon reservoirs, and potential hazards. Over the years, various seismic acquisition techniques have been developed and utilized to obtain accurate and high-resolution subsurface images. Among these techniques, the use of land streamer data has gained significant attention due to its effectiveness in conducting large-scale surveys and providing detailed information about near-surface geology in a very short time.

Land streamer data acquisition involves the deployment of multiple geophones in a linear configuration along the ground surface. These geophones are connected by cables or wireless systems, allowing for the simultaneous recording of seismic signals at various spatial locations. This configuration enables the acquisition of continuous seismic data along a profile, providing valuable insights into subsurface structures and properties.

The main advantages of land streamer surveys compared to the conventional seismic technique are that they quickly generate images and cover longer profile lengths. However, it suffers from the low signal-to-noise ratio (SNR) at large source-receiver offsets due to the weak receiver-ground coupling. In surface seismic acquisition, offset refers to the horizontal distance from source to receiver. The maximum source-receiver offset in a typical land streamer survey should not exceed 140 m to 200 m, which will affect the maximum penetration depth. Typically, land streamer surveys are used for shallow applications (less than 40 meters deep), and they are beneficial in geotechnical, environmental, shallow geology, and near-surface hazard applications.

In another technique, the land streamer length is doubled by adding a second shot point. In this technique, the original streamer length (L) can be doubled to 2L by using two shot points located at offset L from each other. In particular, the length of land streamers can be increased two or more times by using more than one source located at offsets equal to 2× or more of the original length of the streamer, respectively. The data recorded from both shot points are gathered together to double the length of the streamer. Although this approach doubled the length of the streamer (i.e., increased penetration depth), the SNR is not significantly improved since the source-receiver distance is still large.

Land streamer seismic data extrapolation can be used to increase the penetration depth. The extrapolation of seismic land streamer data refers to extending the recorded data beyond the original acquisition extent. The extrapolation technique is beneficial when the acquired data coverage is limited and does not fully capture the desired survey area. The extrapolation of the data makes obtaining a more comprehensive and representative image of the subsurface possible, enabling a more accurate interpretation and analysis.

Existing methods and algorithms for extrapolating seismic land streamer data employ wavefield extrapolation techniques using Kirchhoff migration and Fourier transform-based methods. These methods utilize the recorded seismic data and apply mathematical algorithms to estimate the missing data points and extend the seismic image beyond the original acquisition area. Additionally, interpolation techniques, such as kriging and spline interpolation have also been utilized to fill in gaps and provide a smooth transition between the recorded data points.

Seismic data interpolation extrapolation can use interferometry for enhancement and redatuming. Redatuming data consists in virtually moving the sources and receivers from the original acquisition level to a new location. Refraction interferometry technique increases the SNR of the refraction arrivals at large source-receiver offsets. Stacking is used to generate virtual refraction arrival with increased SNR and the enhancement in SNR is proportional to N, where N is the number of post-critical shot locations associated with the same pair of geophones. However, in the refraction interferometry the virtual source is redatumed to the subsurface at unknown location and excitation time of the virtual data is unknown. Further, the source-receiver raypath of the virtual trace is shorter than the recorded traces which yields a shallower depth of penetration.

In supervirtual interferometry (SVI) information about the subsurface is derived from the energy associated with the enhanced refraction signals. A virtual shot record is formed that suppresses uncorrelated noise and yields a virtual refraction that intercepts zero offsets at zero time. To address these problems and redatum of the virtual source back to the surface, the recorded raw traces are convolved with the calculated virtual traces to relocate the virtual sources to the original surface locations and update the excitation time to make it equal to zero.

Iterative supervirtual refraction interferometry (ISVI) can be used to enhance traces with very low SNR or huge source-receiver offsets. However, SVI and ISVI do not generate new traces and enhance only existing traces by increasing their SNR. In one approach, interferometry is employed to generate new traces including increasing the number of first arrivals beyond the maximum recording offsets. The generation of new traces was tested on conventional seismic arrays using synthetic and field examples. The interferometric extrapolation increased the length of the recorded conventional seismic data. The synthetic and field examples show that the source-receiver offsets successfully extrapolated past the original maximum offset using the interferometric extrapolation technique.

However, the interferometric extrapolation has not been applied to the land streamer data. Land streamer seismic arrays do not achieve the penetration depth below the surface that can be achieved by conventional seismic arrays, due in part to the shorter source-receiver offsets when compared with conventional surveys. Also, long land-streamers suffer from a low signal-to-noise ratio (SNR) due to the bad receiver-ground coupling and will cause logistic problems due to transportation and dragging over rough ground. Consequently, land-streamers are usually less than 150 m in length with 48 to 120 receivers. On the other hand, a land-streamer survey can yield better results in shallow depth relative to the conventional seismic setup.

Accordingly, it is one object of the present disclosure to improve the resolution of a subsurface tomography compared to a conventional seismic survey, and at an increased penetration depth below the surface than has been achieved with previous land streaming. It is a further object of the present disclosure to provide methods and systems for applying the interferometric extrapolation to land streamer data and using a deconvolution step after the convolution step to depress the level of an artefact on the final results, where artefact is any error in the perception or representation of any information introduced by the involved equipment or technique.

SUMMARY

An aspect is a land streamer-based seismic system that includes a land streamer layout configured as a plurality of surface geophones connected in a linear arrangement along a ground surface. The geophones are connected by cables. The plurality of surface geophones simultaneously receive multiple seismic signals at various spatial locations to obtain a plurality of recorded traces. The land streamer-based seismic system further includes a processing circuitry which is configured to extrapolate the recorded traces using interferometric extrapolation. The extrapolation of the recorded traces using interferometric extrapolation includes two steps. In first step, the recorded traces are cross-correlated to generate virtual traces and the virtual traces that share a same ray path are stacked together to enhance signal-to-noise ratio of the virtual traces. In second step, the virtual traces are convolved with the recorded traces to generate super-virtual traces having longer ray paths than the recorded traces. All super-virtual traces that share a same source and receiver points are stacked to further enhance signal-to-noise ratio of final super-virtual traces. The recorded traces are appended with the enhanced final super-virtual traces to obtain a full set of calculated traces. The land streamer layout is moved to another location on the ground surface and steps to obtain another full set of calculated traces are repeated. The subsurface geology is identified for layers of rock at the at various spatial locations based on the calculated traces.

A further aspect is a method for extrapolating seismic land streamer data is described. The method includes deploying a land streamer layout configured as a plurality of surface geophones connected in a linear arrangement along a ground surface. The surface geophones are connected by cables. The method further includes simultaneously recording multiple seismic signals from the plurality of surface geophones at various spatial locations to obtain a plurality of recorded traces. The recorded traces are extrapolated, by a processing circuitry using interferometric extrapolation using two steps. In first step, the recorded traces are cross-correlated to generate virtual traces and the virtual traces that share a same ray path are stacked together to enhance signal-to-noise ratio of the virtual traces. The method includes a second step of convolving the virtual traces with the recorded traces to generate super-virtual traces having longer ray paths than the recorded traces, and stacking all super-virtual traces that share a same source and receiver points to further enhance signal-to-noise ratio of final super-virtual traces. The method further incudes appending, by processing circuitry, the recorded traces with the enhanced final super-virtual traces to obtain a full set of calculated traces and moving the land streamer layout to another location on the ground surface and repeating steps to obtain another full set of calculated traces. The method further includes identifying subsurface geology for layers of rock at the at various spatial locations based on the calculated traces.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
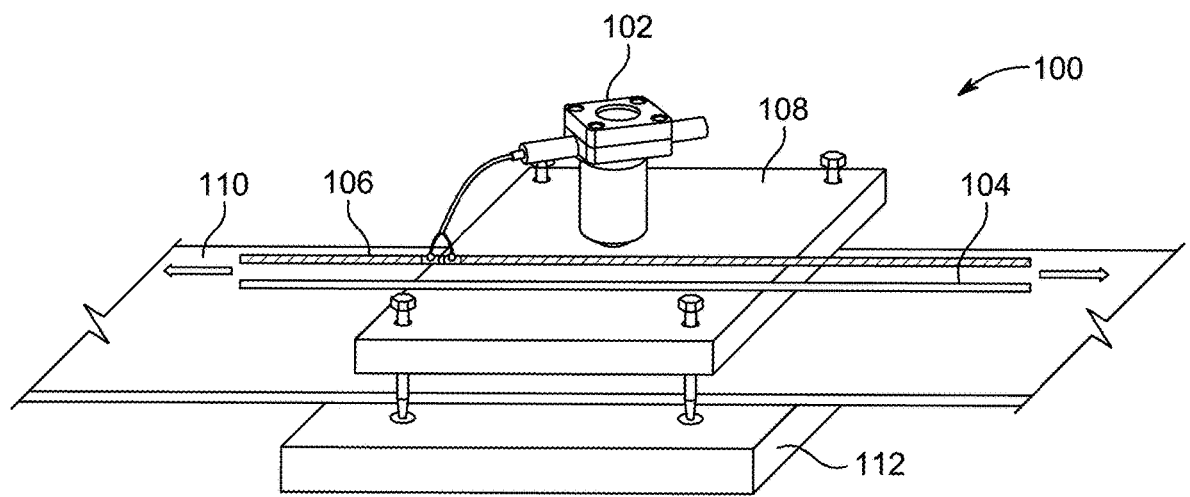
FIG. 1A and FIG. 1B illustrate components of land-streamers, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for utilizing an interferometric technique to extrapolate land streamer data. From one perspective, the technique can be viewed as a two-step process. In the first step, the recorded traces are correlated to generate virtual traces. The virtual traces that share the same ray path are stacked together, to enhance the signal-to-noise ratio (SNR). In the second step, the generated virtual traces are convolved with the recorded traces to produce new super-virtual traces characterized by longer ray paths than any of the recorded traces. These new traces represent source-receiver pairs that were not initially recorded and possess source-receiver offsets larger than all the recorded traces. Subsequently, the traces sharing the same ray path are stacked together to further improve the SNR of the final virtual traces.

The aspects of the disclosure employ an interferometric extrapolation technique to extend land streamer data, including generation of new source-receiver traces beyond the original recording area. The extrapolation technique relies solely on the available data and does not require additional simulations or modeling. A deconvolution step is used after a convolution process to reduce artefact levels in the final results. Iterative Super Virtual Interferometry (ISVI) is employed after the extrapolation to enhance the SNR of the virtual traces for those extrapolated traces that exhibit low SNR.

A land-streamer includes a group of geophones designed to be towed along the surface of the ground. Geophones are sensors designed to detect seismic waves traveling through the ground. The geophones convert ground motion into electrical signals, which are then transmitted to recording equipment via the geophone cable.

Figure 1B:
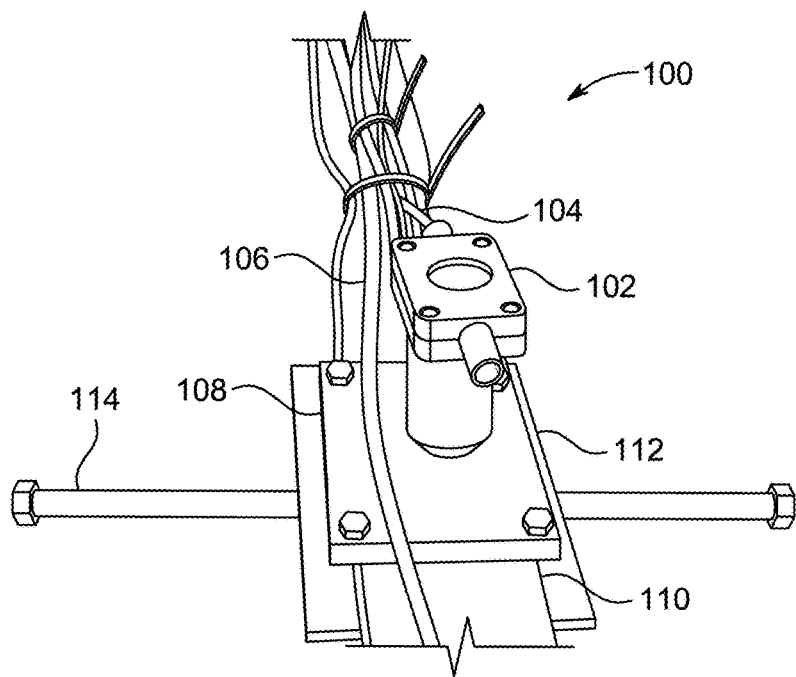

FIG. 1A and FIG. 1B illustrate components of an example implementation of land-streamers, according to certain embodiments. The main components of a land-streamer 100 (FIGS. 1A and 1B) are (a) the geophone, which could be a P-wave or S-wave receiver 102, (b) the plate, which is a heavy metal that enhances the coupling between the receiver and the ground. In an aspect of the disclosure, the land streamer includes two plates, a lower plate made of steel 112 and an upper plate made of aluminum 108. There are two side wings in form of screw 114 made of iron to increase stability during the acquisition: a streamer 110 made of tough material that can connect all plates together, (d) the cables 104 and 106 that connect the receivers to the recording system, and (e) the recording system (not shown). Components (a-d) are connected to each other and moved to/from the field as one unit, which saves a lot of installing time at the field.

The cables include a geophone cable 106 and a data cable 104. A geophone cable 106 is a type of cable used in seismic surveying, primarily to connect geophones to seismic recording equipment. Geophones 102 are sensors that detect ground motion, which is critical in geophysical studies like seismic exploration, earthquake monitoring, and other subsurface investigations. The geophone cable 106 serves as the physical medium through which the signals from the geophones are transmitted to data acquisition systems for further analysis. The geophone cable 106 is often designed to be durable, resistant to environmental conditions, and capable of handling the signal integrity needed for accurate seismic data. The geophone cable 106 is capable of transmitting the low-voltage signals generated by geophones over long distances without signal degradation. The geophone cable 106 needs to withstand various environmental conditions, like moisture, extreme temperatures, and mechanical stress, especially since seismic surveys are often conducted in rugged terrains. The geophone cable 106 typically has multiple conductors, as geophone arrays often consist of several geophones, each requiring an individual wire for signal transmission. The data cable 104 is a type of cable used to transfer data between devices, typically used in electronic devices, sensors, and communication systems. The data cable 104 is essential for transmitting the data collected by geophones to data acquisition systems or computers for further analysis.

FIG. 1A shows the receiver, the plates, the streamer, and the cables connected to the recording system. FIG. 1B is a perspective view of the land-streamer. The two screws 114 shown at the sides of the plate are used to increase the stability of the land-streamer on irregular terrains.

Generally, geophones 102 planted in the ground set the standard for data quality. On the other hand, land streamers can record excellent data in many applications while making the survey economically feasible. A common belief is that "good" affordable survey is better than a "great" survey that can't be done due to its cost. However, the present disclosure seeks to improve resolution at a deeper penetration depth of a land-streamer based seismic survey. To reach deeper penetration depths without increasing the length of the land-streamer, the length of a land-streamer can be effectively doubled or tripled if two or three seismic sources are used at offsets equal to the length of the land-streamer. The depth of penetration can be increased without increasing the logistics requirements of moving longer land streamers.

The land-streamer 100 is assembled using spike-less 40-Hz P-wave receivers 102 and then connecting them to a Geometrics Geode recording system. A Polyester Webbing Belt is used to connect all plates together. The Polyester Webbing Belt is fixed between the lower and the upper plates. The land streamer consists of 48 channels with a receiver interval of 127.5 cm. The land-streamer 100 is used to record seismic data at a location and a conventional seismic profile is also recorded at the same location of the land-streamer profile for comparison. The conventional seismic profile consists of 96 channels with a 127.5 cm receiver interval.

The recorded land-streamer traces with the recorded corresponding traces from the conventional seismic data set are compared. The land-streamer seismic surveys require less installation time when compared to conventional seismic surveys since the receivers and cables are already assembled, and no receiver planting is required. Land-streamer only needs a few minutes (less than 15 min) to collect the streamer and move to the next acquisition site, while the conventional system requires at least one hour to collect all cables and receivers from the site. Thus, in total, land-streamer survey saves about 80% of the acquisition time, which is used for planting/collecting equipment in the field. When recording long seismic profiles, land-streamer is very efficient in operation. To record a very long conventional data set, the profile is divided into several segments, plant the receivers and connect the cables for each segment, collect receivers and cables after shooting each segment, which is very time consuming, while all of this is not required in the land-streamer survey.

Thus, the time required to install and collect the land-streamer system is 4 to 6 times less than the time required to install and collect the conventional system. In the case of long profiles where the conventional system must be installed and moved several times to cover the whole profile, the land-streamer is much more efficient and will save days of field-work.

Figure 2:
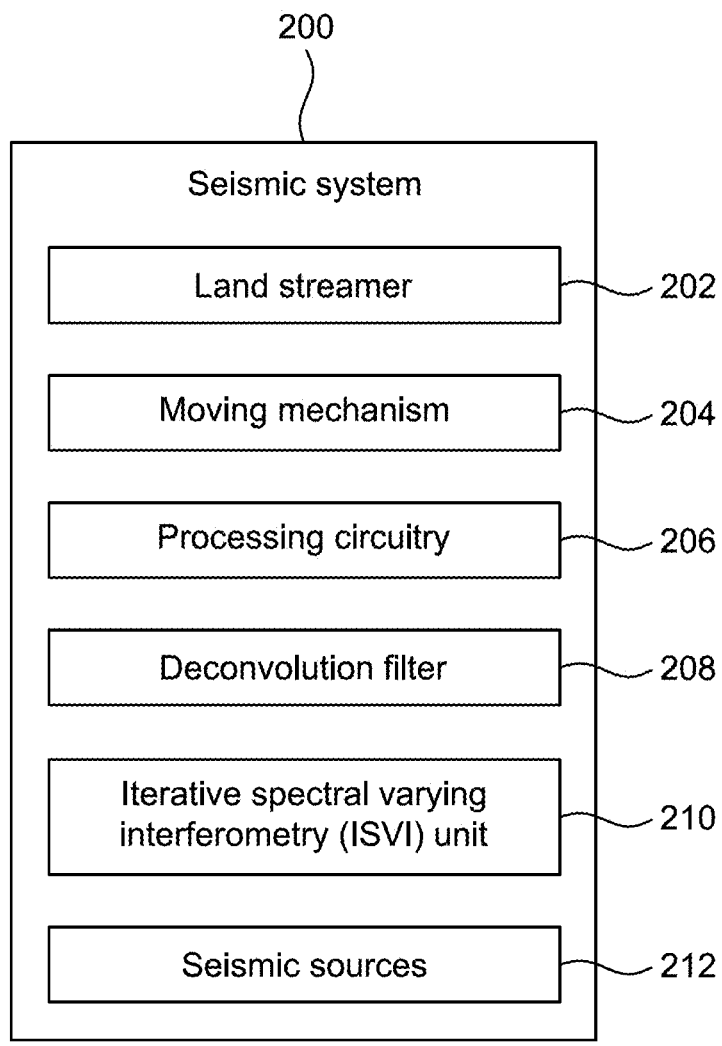
FIG. 2 illustrates a block diagram of a land streamer-based seismic system according to certain embodiments.

FIG. 2 illustrates a block diagram of a land streamer-based seismic system 200, according to certain embodiments. According to an aspect, the land streamer-based seismic system 200 includes at least a land streamer layout 202, a moving mechanism 204, a processing circuitry 206, a deconvolution filter 208, Iterative Spectral Varying Interferometry (ISVI) unit 210, and seismic sources 212. The processing circuitry 206 is configured to perform functions including at least a cross correlation, stacking, convolution, appending, and subsurface geology identification.

The cross-correlation function includes performing cross-correlation of the recorded traces to generate virtual traces. The stacking function includes stacking of the virtual traces that share a same ray path to enhance signal-to-noise ratio of the virtual traces, The convolution function includes convolving the virtual traces with the recorded traces to generate super-virtual traces having longer ray paths than the recorded traces. The appending function includes appending the recorded traces with the enhanced final super-virtual traces to obtain a full set of traces. The subsurface geology identification functionality includes identifying subsurface geology for layers of rock at the at various spatial locations.

The land streamer layout 202 includes a number of surface geophones connected in a linear configuration along a ground surface. The geophones are connected by cables and a density of the surface geophones on the ground surface is substantially double a density of subsurface geophones. The surface geophones simultaneously receive multiple seismic signals at various spatial locations to obtain recorded traces. The surface geophones are receivers having a stabilizing arm that is substantially perpendicular to the land streamer to ensure lateral stability during data acquisition. The layout of the land streamer is such that an offset between a first receiver and a shot point (source) is 4 m.

The moving mechanism 204 is configured to tow the land streamer layout to another location on the ground surface.

The seismic sources 212 are devices used to generate seismic waves that travel through the Earth's subsurface. These waves are then detected by geophones (or other seismic sensors), and the data collected helps in mapping and studying the Earth's subsurface for applications such as oil and gas exploration, mineral exploration, geotechnical investigations, and earthquake research. There are several types of seismic sources such as Explosion Sources, Vibratory Sources, Air Guns, and others. The seismic sources 212 are configured to apply a seismic signal. The seismic sources located at the ground surface and at offsets equal to length of the land streamer layout. The seismic sources are configured to apply both P- and S-wave signals.

P-waves (Primary waves) and S-waves (Secondary waves) are two types of seismic body waves that travel through the Earth's interior. These waves are generated by seismic sources (such as explosions, vibrations, or earthquakes) and are critical in seismic studies because they provide different types of information about the Earth's subsurface. P-waves (Primary Waves) are also known as compressional waves or longitudinal waves. These are the fastest seismic waves and travel at high velocity through solids, liquids, and gases. S-waves (Secondary Waves) are also known as shear waves or transverse waves. These waves are slower than P-waves and travel at about 60-70% of the speed of P-waves. They can travel through only solids (not liquids or gases).

P-wave and S-wave receivers are specialized sensors used to detect and record P-waves (Primary waves) and S-waves (Secondary waves) in seismic surveys or geophysical investigations. These receivers are designed to be sensitive to the specific types of seismic waves and to provide accurate data about the properties of the subsurface or to monitor seismic events like earthquakes.

In an aspect of the disclosure, the land streamer data is acquired and interferometric extrapolation is applied to the acquired data. In such case, certain types of artefacts may be generated due to the extrapolation. The deconvolution filter 208 is used after a convolution step to depress the level of these types of artefacts in the final results. ISVI unit 210 is used after the extrapolation to enhance the virtual SNR for those extrapolated traces that show low SNR. The expected gain from applying land streamer extrapolated SVI (LS-ESVI) is twofold; the first is to virtually double the length of the streamer by extrapolating the recorded data beyond the survey area. The second is to increase the number of first arrival picks and the maximum source-receiver offsets, which will increase the depth of penetration and enhance the resolution of the final image.

Figure 3:
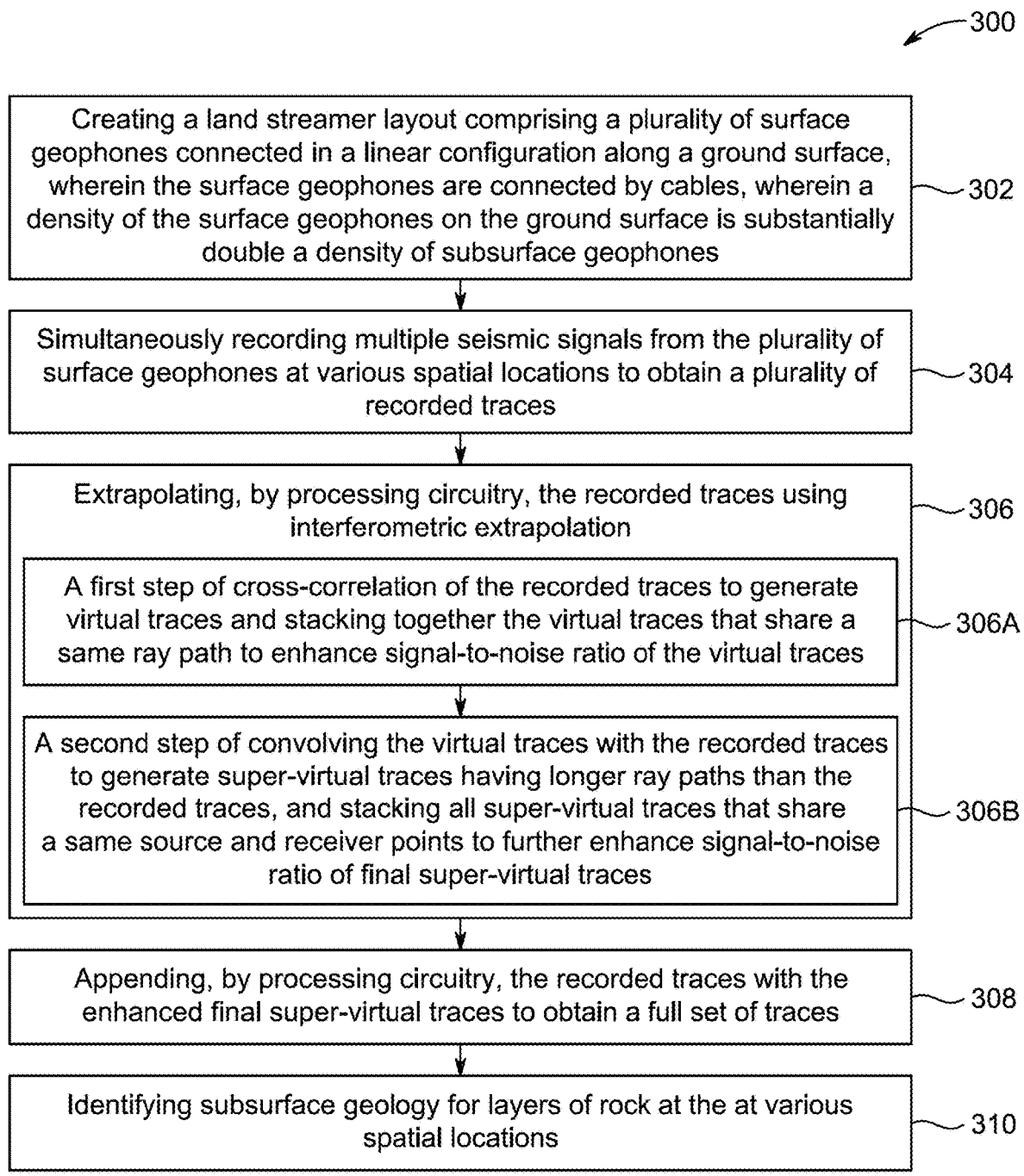
FIG. 3 illustrates a method for extrapolating seismic land streamer data according to certain embodiments.

FIG. 3 illustrates a method for extrapolating seismic land streamer data according to certain embodiments. At step 302, a land streamer layout is deployed which is configured as a number of surface geophones connected in a linear arrangement along a ground surface. The surface geophones are connected by cables. In a preferred configuration, a density of the surface geophones on the ground surface is substantially double a density of a conventional arrangement of subsurface geophones. The land streamer layout is such that an offset between a first receiver and a shot point (source) is 4 m.

At step 304, multiple seismic signals are simultaneously recorded from the number of surface geophones at various spatial locations to obtain recorded traces. The seismic signal is applied by a number of seismic sources located at the ground surface and at offsets equal to length of the land streamer layout. As an example, if the original length of the land-streamer is 100 m, then the offset is also equal to 100 m.

At step 306, the recorded traces are extrapolated using interferometric extrapolation. The extrapolation further includes two steps. In first step 306 A, cross-correlation of the recorded traces is performed to generate virtual traces and the virtual traces that share a same ray path are stacked together to enhance signal-to-noise ratio of the virtual traces. In second step 306 B, the virtual traces are convolved with the recorded traces to generate super-virtual traces having longer ray paths than the recorded traces, and all super-virtual traces that share a same source and receiver points are stacked to further enhance signal-to-noise ratio of final super-virtual traces. At step 308, the recorded traces are appended with the enhanced final super-virtual traces to obtain a full set of calculated traces using a processing circuitry. At step 310, subsurface geology is identified for layers of rock at various spatial locations. Before the subsurface geology is identified, the land streamer layout may be moved to a new location, for example, using a tow vehicle.

Figure 4A:
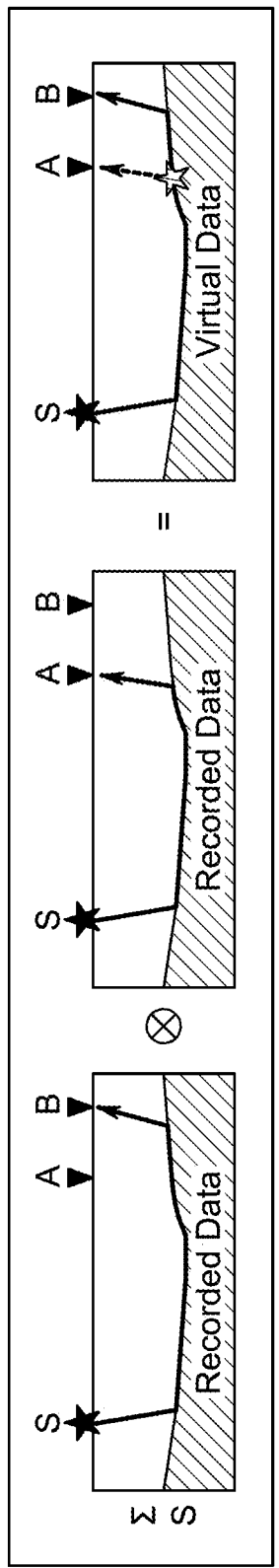
FIG. 4A illustrates a first step of generating the virtual traces in supervirtual interferometry technique using cross correlation and stacking according to certain embodiments.

FIG. 4A illustrates first step of generating the virtual traces in supervirtual interferometry technique using cross correlation and stacking. FIG. 4A shows two receivers A and B and a shot (source) S. The traces from the shot S are recorded by the receivers A and B. The trace recorded at receiver B from shot S is correlated by the trace recorded at receiver A from the same shot S, then stacked over all post-critical S locations to generate the virtual trace recorded at B from a virtual shot point located in the subsurface at the unknown location marked by a star at subsurface.

Figure 4B:
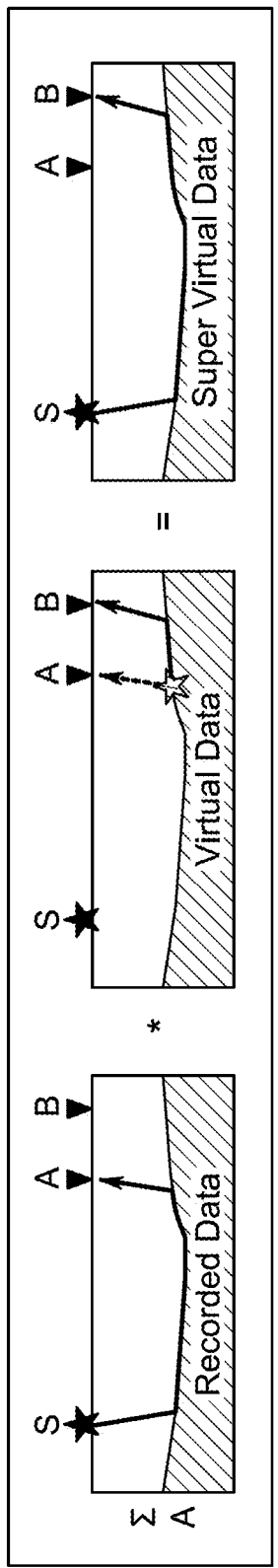
FIG. 4B illustrates a second step of generating the super virtual traces in supervirtual interferometry technique using convolution and stacking according to certain embodiments.

FIG. 4B illustrates a second step of generating the super virtual traces in supervirtual interferometry technique using convolution and stacking. FIG. 4B illustrates that the trace recorded at receiver A from shot S is convolved by the virtual trace generated in the first step and recorded at B from the virtual shot, then stacked over all A locations to generate the supervirtual trace recorded at B from the virtual shot point located S. This supervirtual trace provides higher SNR when compared to the corresponding recorded trace.

Figure 5:
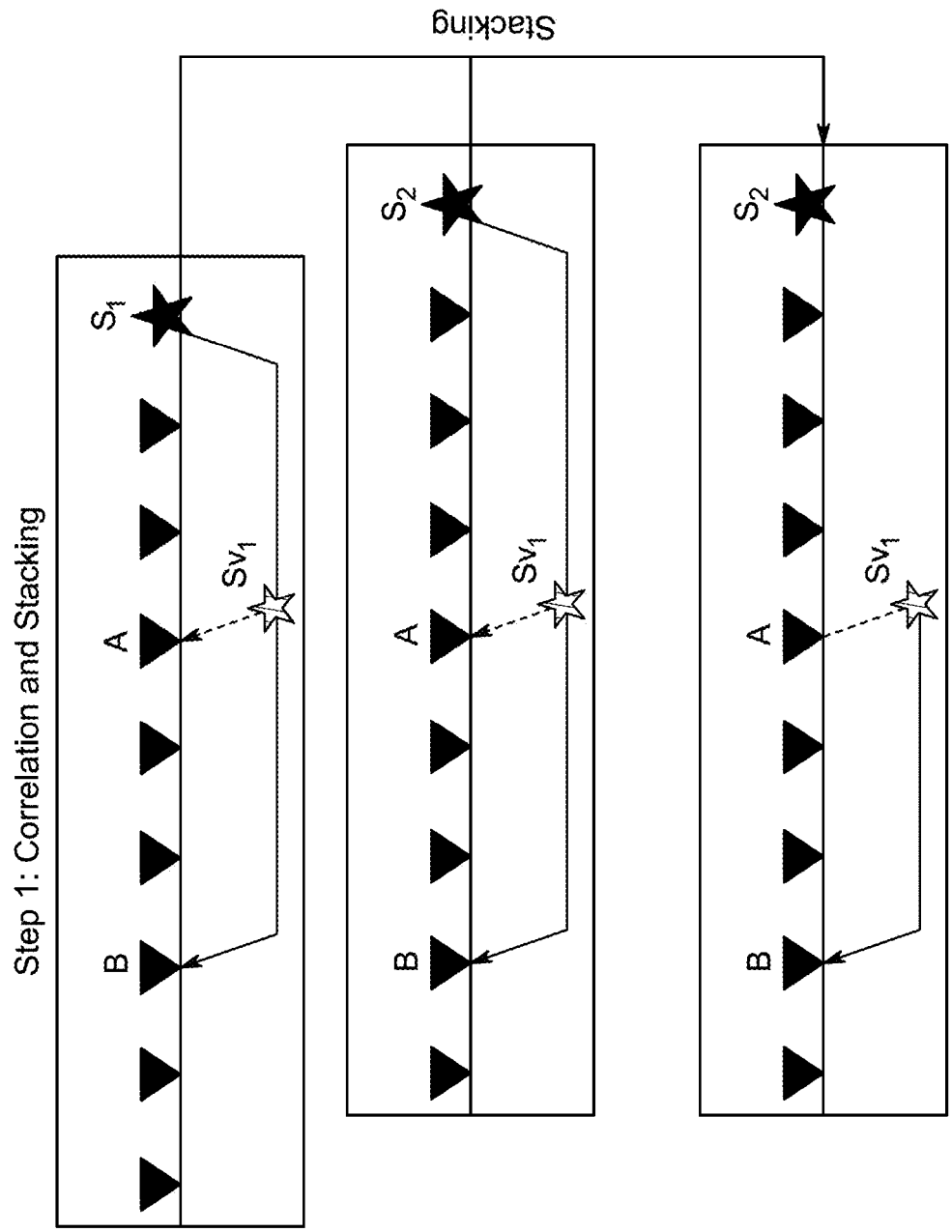
FIG. 5 illustrate generating the virtual traces and stacking all virtual traces, according to certain embodiments.

In another exemplary embodiment, FIG. 5 illustrates the interferometric seismic data extrapolation as a 2-step land streamer extrapolated SVI (LS-ESVI) process. FIG. 5 shows the first step, the cross-correlation and stacking step. The line touching triangles represents the ground surface, the triangles are the physical receivers, the black star is the physical source, the white star is the virtual source, the black solid lines are positive ray paths, and the black dashed lines are the negative ray paths.

Figure 6:
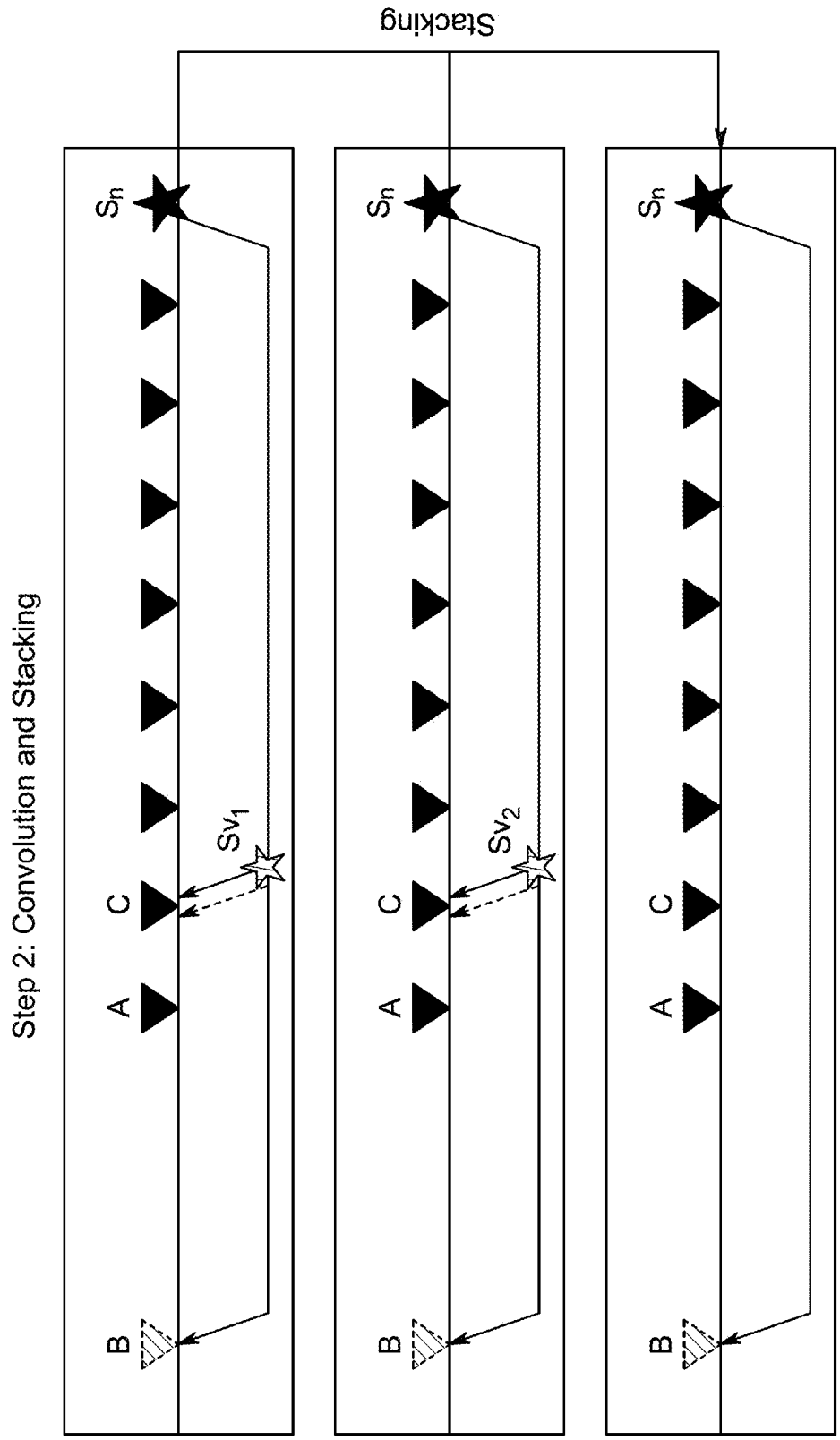
FIG. 6 illustrate the second step of two-step land streamer extrapolated SVI (LS-ESVI) according to certain embodiments.

FIG. 5 and FIG. 6 illustrate generating the virtual traces by cross-correlating the recorded traces $G(A|S_1)$ and $G(B|S_1)$ to generate the virtual trace $G(B|S_1)$.

The imaginary part of a Green's function from the source located at $S_1$ to the receiver located at A is $Im[G(A|S_1)]$ and the imaginary part of the Green's function from the same source to the receiver located at B is $Im[G(B|S_1)]$.

The cross-correlation between these two traces is given by $$Im[G(B|A)]^v \approx k \int G(A|S_1)^* G(B|S_1) d^2x \qquad (1)$$

'Im' denotes the imaginary part of Green's function, k represents the wavenumber, and Green's functions refer to the head waves of the recorded data. The offset between the source and receiver points must be larger than the cross-over distance. The cross-over distance is the minimum distance that the receivers will receive refraction energy, i.e. if the source-receiver offset is less than cross-over distance, then the receiver will receive direct energy. If the source-receiver offset is equal to or larger than the cross-over distance, then the receiver will receive refraction energy. In the present disclosure only refraction energy is used, only offsets equal to or larger than cross-over distance are used.

The cross-correlation between these two traces generate a virtual trace $([G(B|A)]^v)$ with a virtual source located at $S_{v1}$ and a receiver at B. As shown in FIG. 5, the raypath connecting the virtual source location $S_{v1}$ and the receiver location A (Sv1→A) is a dashed line to highlight that this part of the raypath has a negative time. The stacking of all virtual traces that share the same virtual source location and the same receiver location enhances the final virtual trace by a factor equal to $\sqrt{N}$, where N is the number of stacked virtual traces. The stacking of all virtual traces that share the same source and receiver points is performed to enhance the final virtual trace.

FIG. 6 illustrates step 2 of the two-step land streamer extrapolated SVI (LS-ESVI). The line touching the triangles represents the ground surface, the triangles are the physical receivers, the black star is the physical source, the white star is the virtual source, the black solid lines are positive ray paths, and the black dashed lines are the negative ray paths. The super-virtual traces are generated by convolving the virtual trace $G(B|A)^v$ with the recorded trace $G(A|S)$. The generated the super-virtual traces are represented as $G(B|S_n)^{Sv}$. FIG. 6 shows stacking all super-virtual traces that share the same source and receiver points to enhance the final super-virtual trace.

Figure 7:
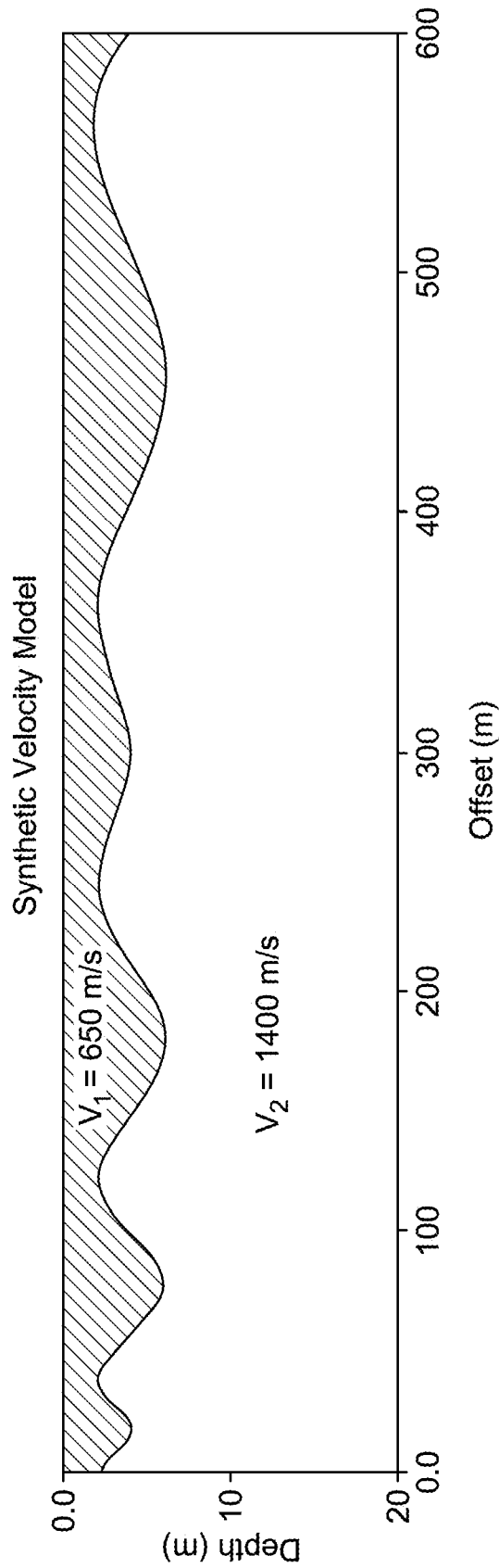
FIG. 7 illustrates a synthetic velocity model for testing the method for extrapolating seismic land streamer data according to certain embodiments.

FIG. 7 illustrates a synthetic velocity model for testing the method for extrapolating seismic land streamer data according to certain embodiments. The synthetic velocity model is a 2-layer model; the first layer has a velocity of 650 m/s, and the velocity of the second layer is 1400 m/s. The boundary between the two layers is irregular, with a thickness range between 2 m and 6 m. This design (irregular shape and change in thickness of the refractor) is used to test the potential of the proposed method.

Figure 8:
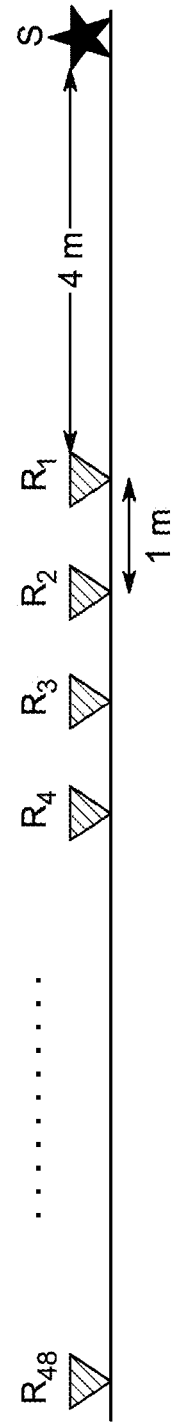
FIG. 8 illustrates a land streamer layout, according to certain embodiments.
Figure 9:
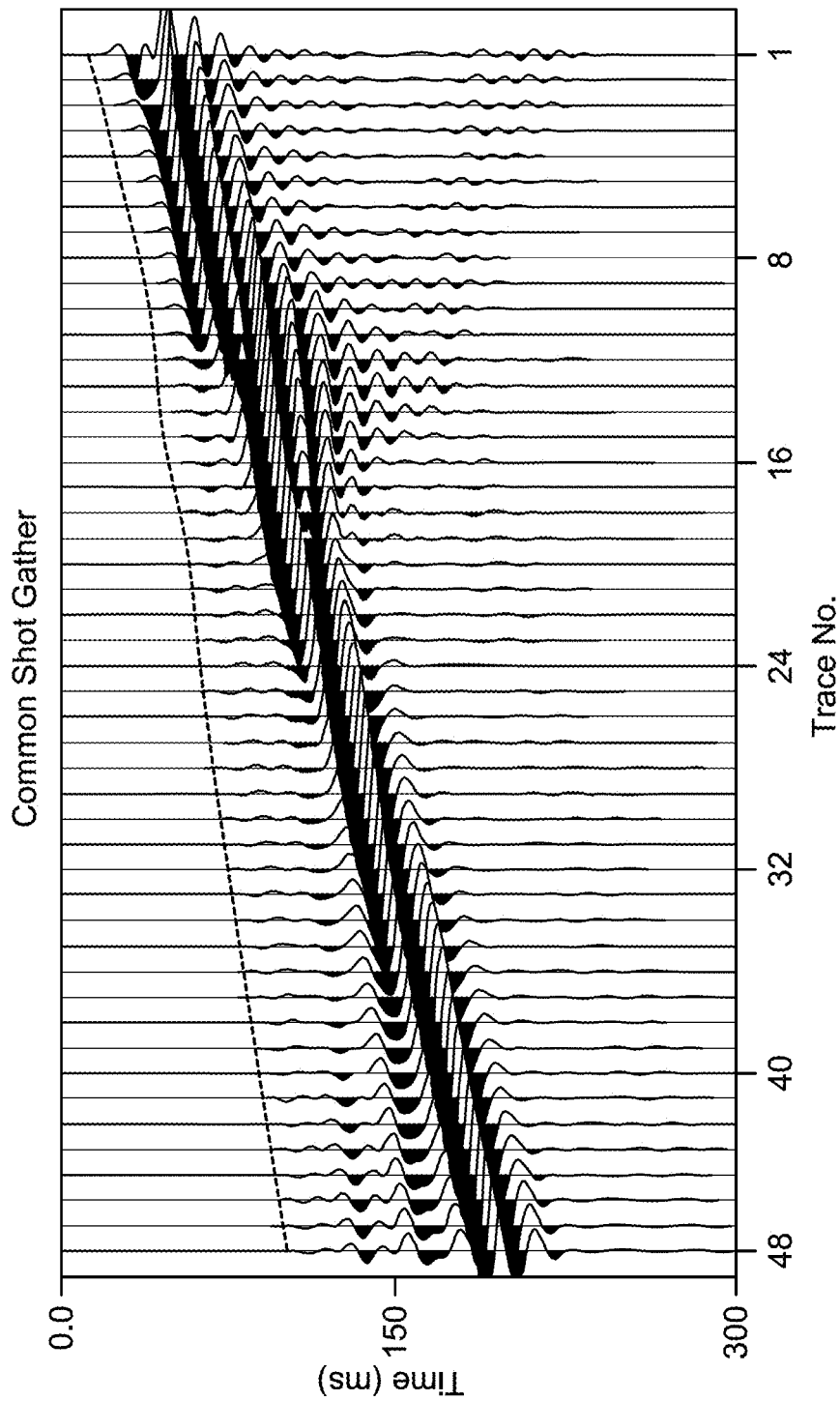
FIG. 9 illustrates a graph representing common shot gather, according to certain embodiments.

FIG. 8 illustrates a land streamer layout, according to certain embodiments. Each shot (source) has 48 receivers, the receiver interval is 1 m, and the offset between the source point and the first receiver is 4 m. 600 receivers and shot (source) points are placed along the ground surface to generate the seismic data with a 1 m receiver/shot interval. This data is then resampled to mimic a land streamer survey where only 48 receivers per shot (source) are used, and the offset between the shot (source) point and the first receiver is 4 m. The least-squares solution of the wave equation is used to generate the synthetic data; the generated land streamer data consists of 548 common shot (source) gathers, and each one has 48 receivers. The shot (source) and receiver intervals are 1 m, and the offset between the first receiver and the shot (source) point is 4 m. A sample of the generated CSGs is shown in FIG. 9. The dashed line marks the first breaks of the head waves.

Figure 10:
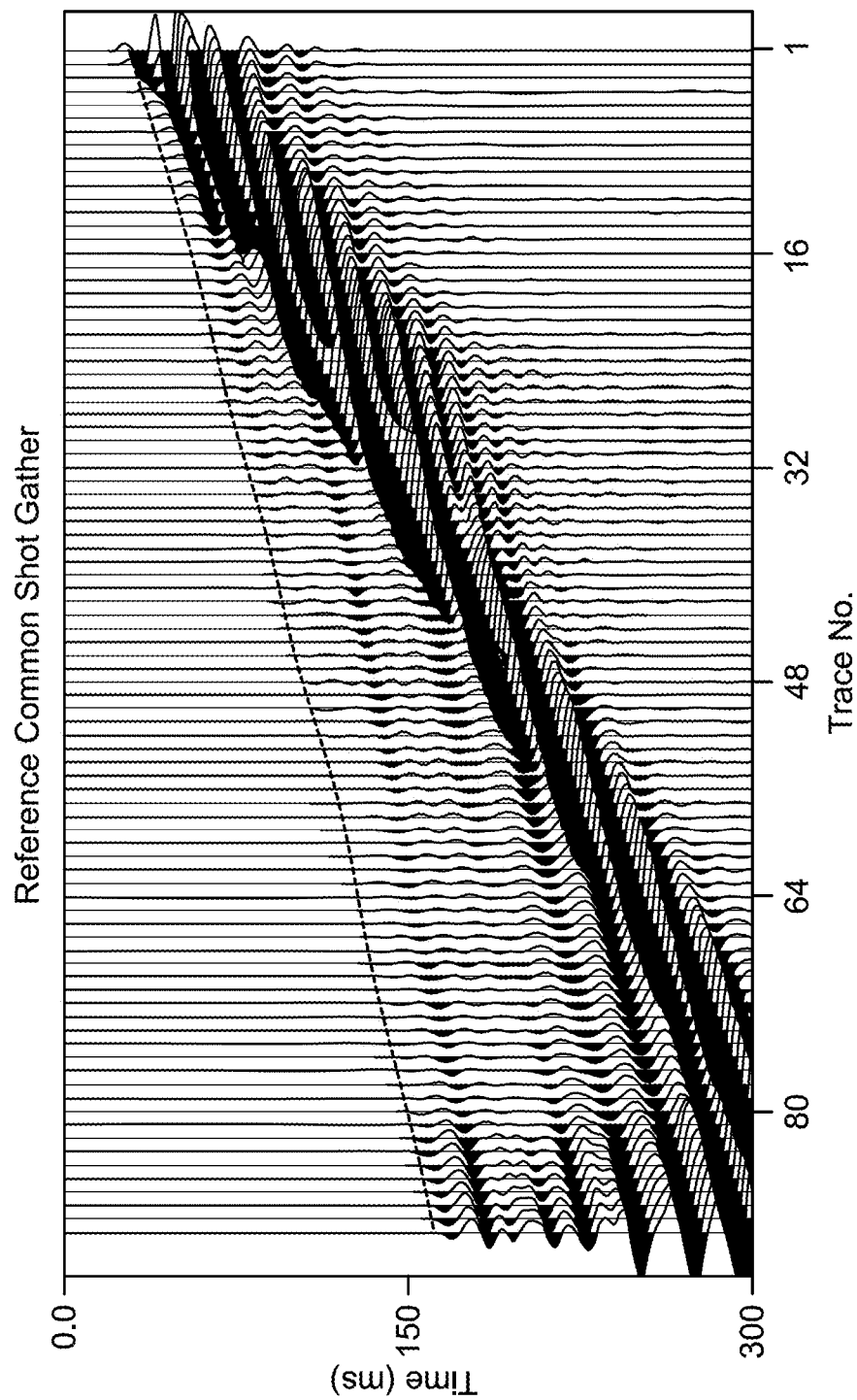
FIG. 10 illustrates a graph that shows sample of the generated traces according to certain embodiments.
Figure 11:
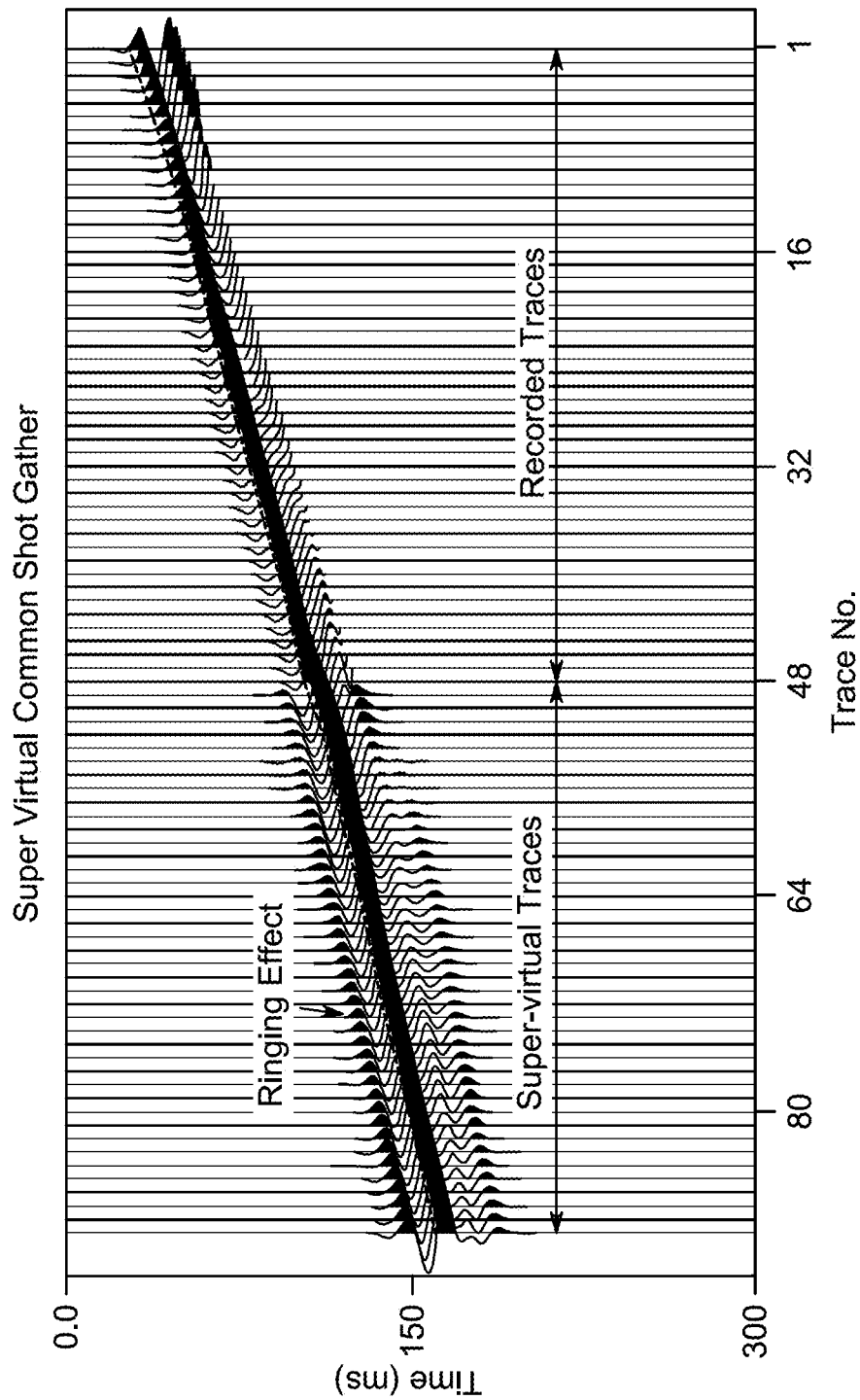
FIG. 11 illustrates a graph that shows sample of the final super-virtual common shot gathers according to certain embodiments.

The LS-ESVI method is applied to the generated land streamer data to extrapolate the recorded traces beyond the original acquisition offset. FIG. 10 shows an example of the extrapolated super-virtual shot gather. Traces 1 to 48 mimic the recorded traces at a land streamer survey, while traces 49 to 89 mimic the extrapolated traces beyond the acquisition offset. The smooth transition between recorded and super-virtual traces indicates good extrapolation results (FIG. 11). An extra wavelet is shown before and after the head waves in the extrapolated traces (traces 49 to 89; FIG. 11); this is due to a ringing effect explained above and can be minimized by applying the deconvolution step provided below.

$$D_{BA} = \frac{G(B|S_1)G(A|S_1)^*}{|G(A|S)|^2 + \varepsilon}; \qquad (2)$$

The deconvolution may not be required in cases where the identification of the head waves is clear, even in the case of ringing.

FIG. 10 illustrates a graph that shows sample of the generated traces according to certain embodiments. The traces 1 to 48 are the land streamer traces used as input for the extrapolation and traces 49 to 89 are generated by solving wave equation and used as a reference for the extrapolated traces.

FIG. 11 illustrates a graph that shows a sample of the final super-virtual common shot gathers according to certain embodiments. Traces 1 to 48 are the recorded traces, and traces 49 to 89 are the extrapolated traces using the LS-ESVI method. The effect of the ringing is shown before and after the first wavelet of the head wave. The continuity of the first break is highly observed. The dashed line in FIGS. 10 and 11 represent the location of the first breaks of the head waves; it is identical in both reference and extrapolated traces, indicating good extrapolation results.

Figure 12:
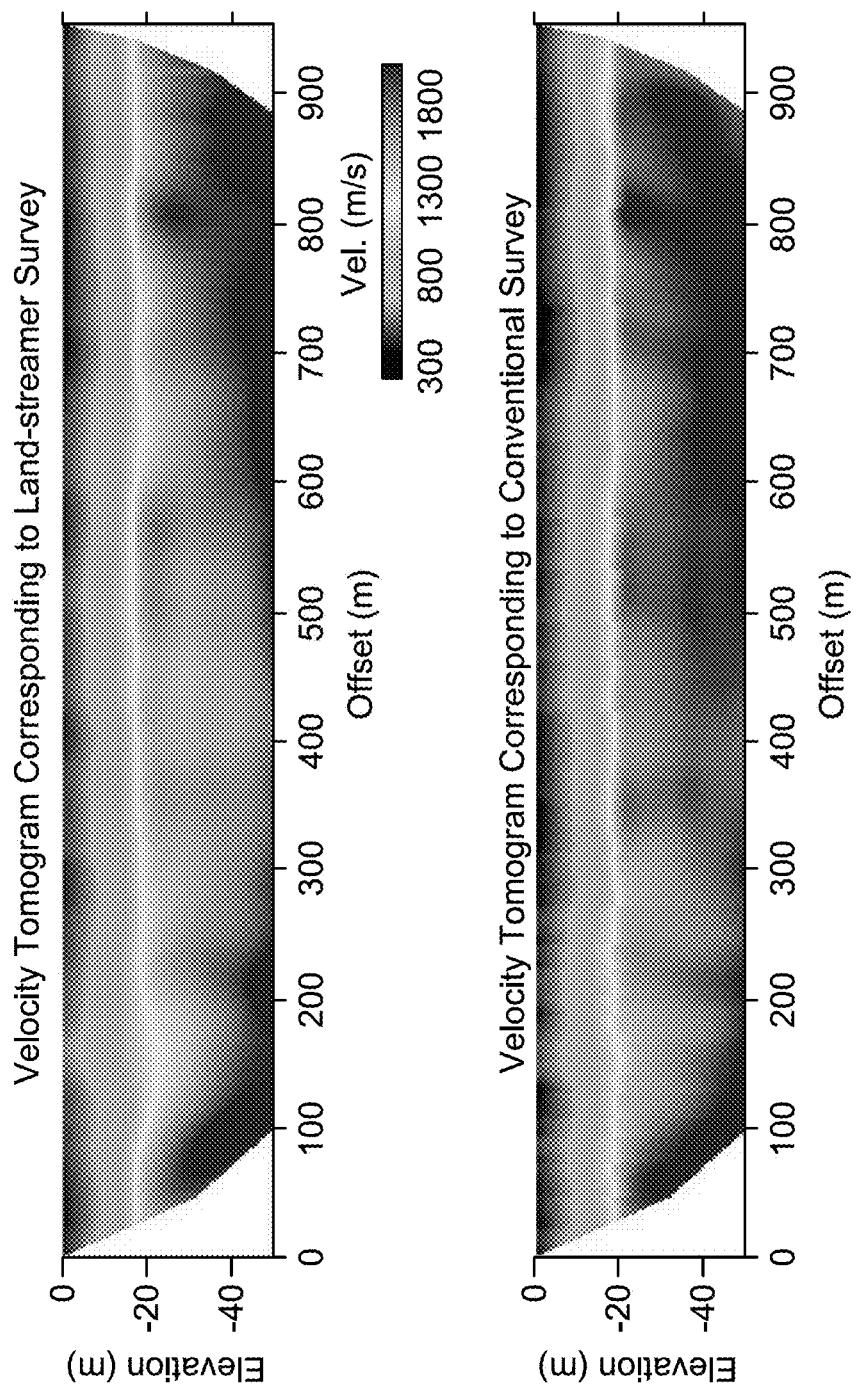
FIG. 12 illustrates two tomograms corresponding to land streamer-based survey and conventional survey.

FIG. 12 illustrates two tomograms corresponding to land streamer-based survey and conventional survey. The upper figure shows the tomogram result using land-streamer survey, while the lower figure shows the corresponding tomogram using conventional seismic survey.

The present disclosure aims to 'virtually' increase the number of receivers used in the land-streamer survey. If the physical land-streamer is consisting of 48 receivers, and the data in the field is recorded using these 48 receivers, assuming that the receiver interval is 1 meter, then the total length of the land-streamer will be 47 meters. Applying the present disclosure will generate (extrapolate) another 48 receivers located at offsets 48 m to 95 m. In another words, after applying the LS-ESVI method, the number of receivers will increase from 48 to 96 and the total length of the land-streamer will be doubled, increasing from 47 m to 95 m. Receivers 1 to 48 (offsets 0 to 47 m) are the original receivers used in the survey and receivers 49 to 96 (offset 48 m to 95 m) are generated using the proposed LS-ESVI method.

FIG. 12 shows that the land streamer generates a much higher resolution and more details about the subsurface geology in the top 50 meters. This can be explained due to the high density of receivers in the land streamer of the present disclosure compared to the conventional technique. By using the land streamer of the present disclosure, the number of receivers is doubled (sometimes tripled), which improves the resolution of the subsurface tomogram compared to the conventional technique.

In exemplary embodiment, a method for extrapolating seismic land streamer data is described. The method includes deploying a land streamer layout 202 configured as a plurality of surface geophones 102 connected in a linear configuration along a ground surface. The surface geophones 102 are connected by cables 106, and a density of the surface geophones on the ground surface is substantially double a density of subsurface geophones. The method further includes simultaneously recording multiple seismic signals from the plurality of surface geophones at various spatial locations to obtain a plurality of recorded traces. The recorded traces are extrapolated, by a processing circuitry using interferometric extrapolation using two steps. In first step, the recorded traces are cross-correlated to generate virtual traces and the virtual traces that share a same ray path are stacked together to enhance signal-to-noise ratio of the virtual traces. The method includes a second step of convolving the virtual traces with the recorded traces to generate super-virtual traces having longer ray paths than the recorded traces, and stacking all super-virtual traces that share a same source and receiver points to further enhance signal-to-noise ratio of final super-virtual traces. The method further incudes appending, by processing circuitry, the recorded traces with the enhanced final super-virtual traces to obtain a full set of calculated traces and identifying subsurface geology for layers of rock at the at various spatial locations based on the calculated traces.

In an aspect, the method further comprises applying a deconvolution filter 208 to the virtual traces.

In an aspect, the method further comprises muting signals in a vicinity of the first arrival travel times.

In an aspect, for extrapolated traces having a signal-to noise ratio (SNR) below a SNR threshold, Iterative Spectral Varying Interferometry (ISVI) is performed after the extrapolation to enhance the SNR of the virtual traces. The ISVI is such that the super-virtual traces are iteratively convolved with a previous iteration of super-virtual traces to generate super-virtual traces with higher SNR.

In an aspect, the SNR threshold is 1 to 1.

In an aspect, the land streamer layout 202 is such that an offset between a first receiver and a shot point is 4 m.

In an aspect, the method further comprises towing the land streamer layout 202 to another location on the ground surface.

In an aspect, a seismic signal is applied by a plurality of seismic sources 212 located at the ground surface and at offsets equal to length of the land streamer layout.

In an aspect, the applying step includes applying both P- and S-wave signals.

In an exemplary embodiment a land streamer-based seismic system 200 is described. The land streamer-based seismic system 200 includes a land streamer layout 202 configured as a plurality of surface geophones 102 connected in a linear arrangement along a ground surface. The geophones 102 are connected by cables 106 and a density of the surface geophones on the ground surface is substantially double a density of subsurface geophones. The plurality of surface geophones 102 simultaneously receive multiple seismic signals at various spatial locations to obtain a plurality of recorded traces. The land streamer-based seismic system further includes a processing circuitry which is configured to extrapolate the recorded traces using interferometric extrapolation. The extrapolation of the recorded traces using interferometric extrapolation includes two steps. In first step, the recorded traces are cross-correlated to generate virtual traces and the virtual traces that share a same ray path are stacked together to enhance signal-to-noise ratio of the virtual traces. In second step, the virtual traces are convolved with the recorded traces to generate super-virtual traces having longer ray paths than the recorded traces. All super-virtual traces that share a same source and receiver points are stacked to further enhance signal-to-noise ratio of final super-virtual traces. The recorded traces are appended with the enhanced final super-virtual traces to obtain a full set of calculated traces. The subsurface geology is identified for layers of rock at the at various spatial locations.

In an aspect, the system further comprises a deconvolution filter 208 to filter the virtual traces based on first arrival travel times.

In an aspect, the processing circuitry 206 is further configured to mute signals in a vicinity of the first arrival travel times.

In an aspect, for extrapolated traces having a signal-to noise ratio (SNR) below a SNR threshold, the processing circuitry 206 is further configured to perform Iterative Spectral Varying Interferometry (ISVI) after the extrapolation to enhance the SNR of the virtual traces. The super-virtual traces are iteratively convolved with a previous iteration of super-virtual traces to generate super-virtual traces with higher SNR.

In an aspect, the SNR threshold is 1.

In an aspect, the land streamer layout is such that an offset between a first receiver and a shot point is 4 m.

In an aspect, the moving mechanism 204 is configured to tow the land streamer layout to another location on the ground surface.

In an aspect, a plurality of seismic sources 212 are configured to apply a seismic signal. The plurality of seismic sources 212 are located at the ground surface and at offsets equal to length of the land streamer layout.

In an aspect, the plurality of seismic sources 212 are configured to apply both P- and S-wave signals.

In an aspect, the surface geophones are receivers 102 having a stabilizing arm that is substantially perpendicular to the land streamer to ensure lateral stability during data acquisition.

Figure 13:
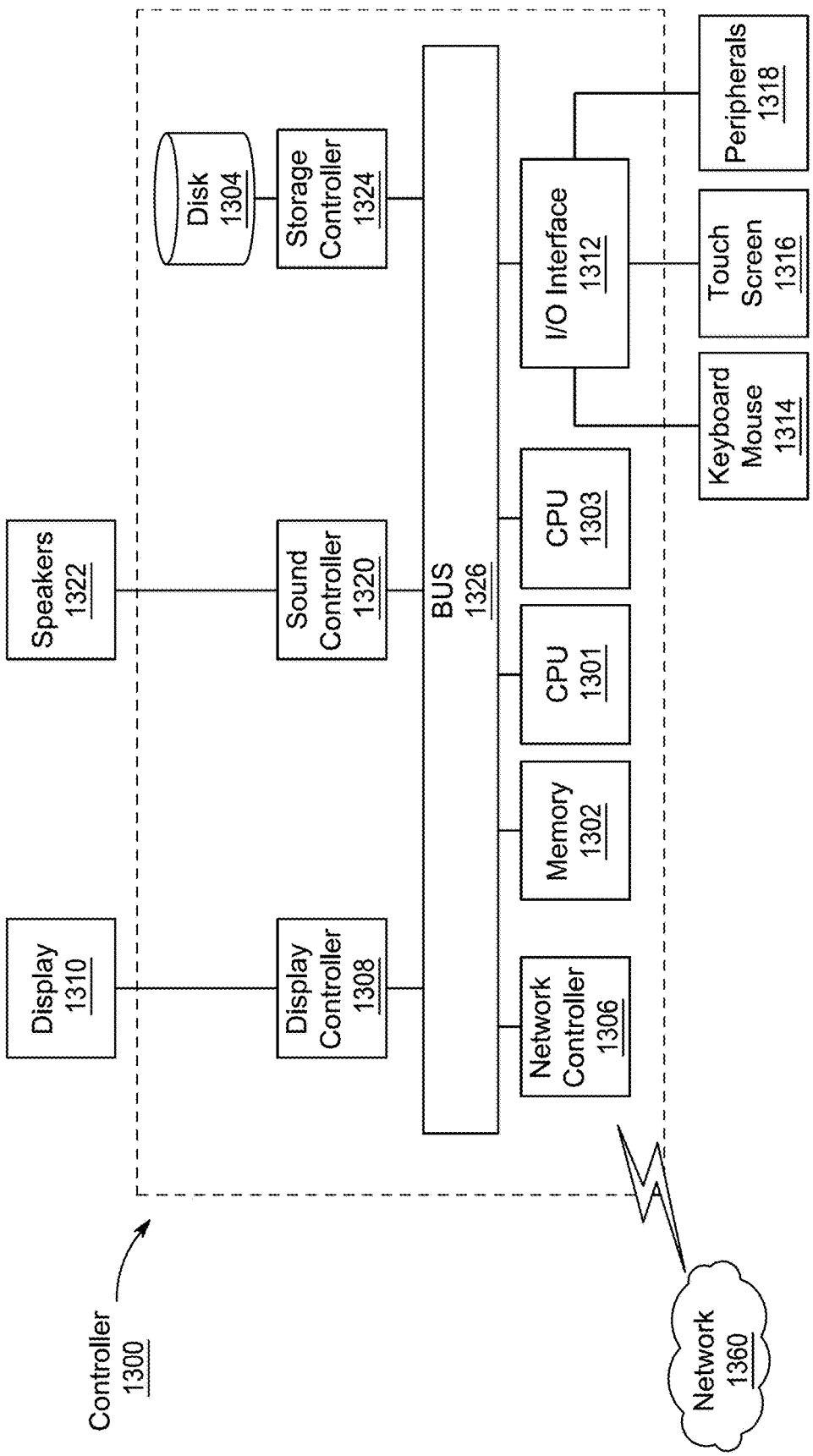
FIG. 13 is an illustration of a non-limiting example of details of computing hardware used in the computing system, according to certain embodiments.

Next, further details of the hardware description of the computing environment according to exemplary embodiments is described with reference to FIG. 13. In FIG. 13, a controller 1300 is described is representative of the processing circuitry 206 of FIG. 2 in which the controller is a computing device which includes a CPU 1301 which performs the processes described above/below. The process data and instructions may be stored in memory 1302. These processes and instructions may also be stored on a storage medium disk 1304 such as a hard drive (HDD) or portable storage medium or may be stored remotely.

Further, the disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the disclosure may be provided as a utility application, background daemon, or component of an operating system, or combination thereof, executing in conjunction with CPU 1301, 1303 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of ordinary skill in the art would recognize. Further, CPU 1301, 1303 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the computing device such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
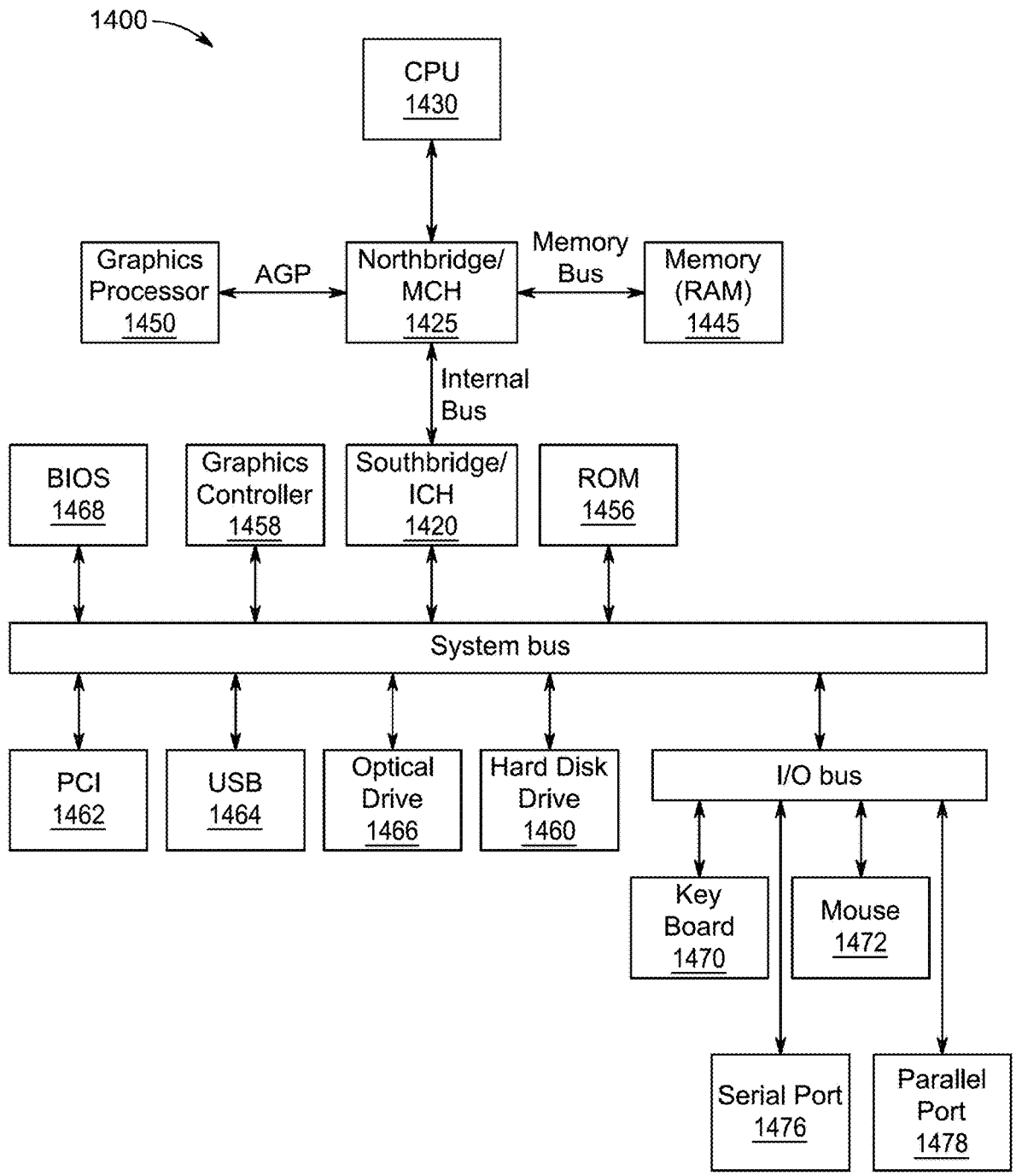
FIG. 14 is an exemplary schematic diagram of a data processing system used within the computing system, according to certain embodiments.

FIG. 14 shows a schematic diagram of a data processing system, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may contain one or more processors and even may be implemented using one or more heterogeneous processor systems.

For example, FIG. 14 shows one implementation of CPU 1430. In one implementation, the instruction register 1438 retrieves instructions from the fast memory 1440. At least part of these instructions is fetched from the instruction register 1438 by the control logic 1436 and interpreted according to the instruction set architecture of the CPU 1430. Part of the instructions can also be directed to the register 1432. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by, e.g., IBM; a SPARC architecture processor by Sun Microsystems or by Oracle; or other known CPU architecture.

Figure 15:
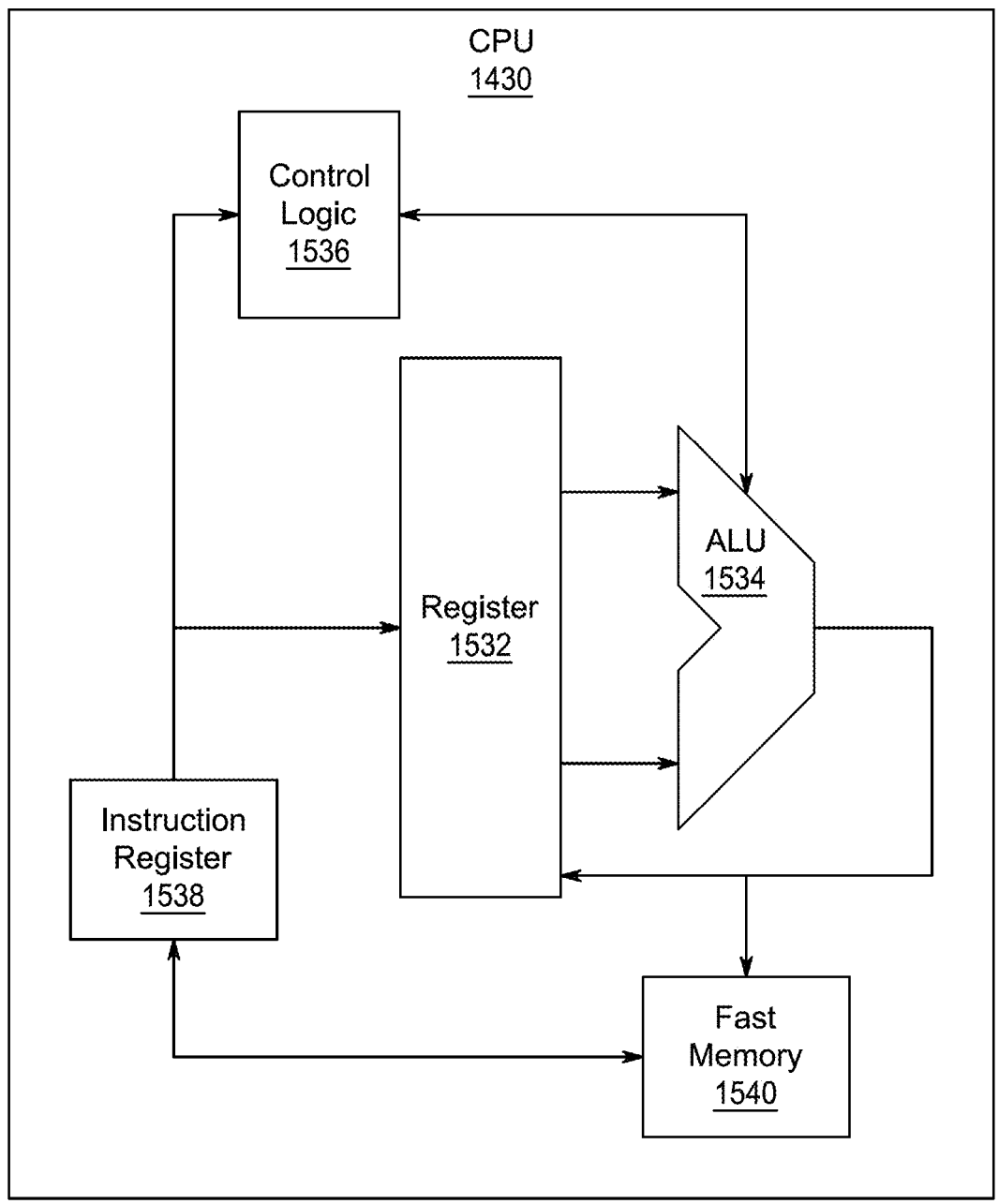
FIG. 15 is an exemplary schematic diagram of a processor used with the computing system, according to certain embodiments.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1588 through a PCI bus 1562.

The PCI devices may include, for example, Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 16:
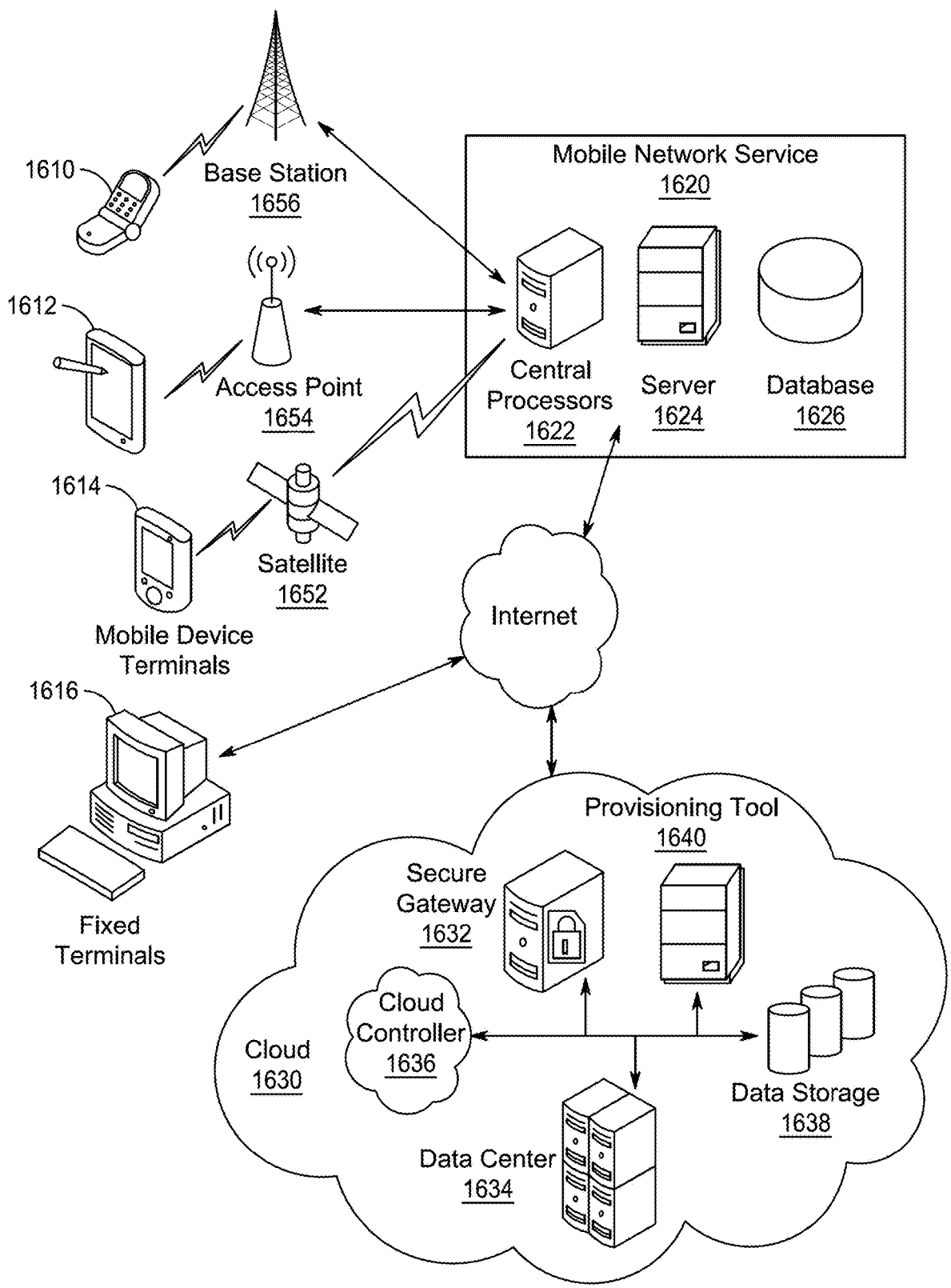
FIG. 16 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1630 including a cloud controller 1636, a secure gateway 1632, a data center 1634, data storage 1638 and a provisioning tool 1640, and mobile network services 1620 including central processors 1622, a server 1624 and a database 1626, which may share processing, as shown by FIG. 16, in addition to various human interface and communication devices (e.g., display monitors 1616, smart phones 1610, tablets 1612, personal digital assistants (PDAs) 1614). The network may be a private network, such as a LAN, satellite 1652 or WAN 1654, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method of extrapolating seismic land streamer data, comprising:
   deploying a land streamer layout configured as a plurality of surface geophones connected in a linear arrangement along a ground surface, wherein the surface geophones are connected by cables;
   simultaneously recording multiple seismic signals from the plurality of surface geophones at various spatial locations to obtain a plurality of recorded traces;
   extrapolating, by processing circuitry, the recorded traces using interferometric extrapolation, by
   a first step of cross-correlation of the recorded traces to generate virtual traces and stacking together the virtual traces that share a same ray path to enhance signal-to-noise ratio of the virtual traces,
   a second step of convolving the virtual traces with the recorded traces to generate super-virtual traces having longer ray paths than the recorded traces, and stacking all super-virtual traces that share a same source and receiver points to further enhance signal-to-noise ratio of final super-virtual traces;
   appending, by processing circuitry, the recorded traces with the enhanced final super-virtual traces to obtain a full set of calculated traces;
   moving the land streamer layout to another location on the ground surface and repeating steps to obtain another full set of calculated traces;
   identifying subsurface geology for layers of rock at the various spatial locations based on the calculated traces; and
   for extrapolated traces having a signal-to noise ratio (SNR) below a SNR threshold, performing Iterative Spectral Varying Interferometry (ISVI) after the extrapolation to enhance the SNR of the virtual traces, wherein the ISVI is such that the super-virtual traces are iteratively convolved with a previous iteration of super-virtual traces to generate super-virtual traces with higher SNR.

2. The method of claim 1, further comprising applying a deconvolution filter to the virtual traces.

3. The method of claim 2, further comprising applying the deconvolution filter to the virtual traces based on first arrival travel times.

4. The method of claim 3, further comprising muting signals in a vicinity of the first arrival travel times.

5. The method of claim 1, wherein the SNR threshold is 1 to 1.

6. The method of claim 1, wherein the land streamer layout is such that an offset between a first receiver and a source is 4 m.

7. The method of claim 1, further comprising moving the land streamer layout by towing, with a tow vehicle, the land streamer layout to another location on the ground surface.

8. The method of claim 1, further comprising applying a seismic signal by a plurality of seismic sources located at the ground surface and at offsets equal to length of the land streamer layout.

9. The method of claim 8, wherein the applying step includes applying both P- and S-wave signals.

10. A land streamer-based seismic system, comprising:
    a land streamer layout configured as a plurality of surface geophones connected in a linear arrangement along a ground surface, wherein the geophones are connected by cables;

the plurality of surface geophones configured to simultaneously receive multiple seismic signals at various spatial locations to obtain a plurality of recorded traces;

processing circuitry configured to extrapolate the recorded traces using interferometric extrapolation, by a first step of cross-correlation of the recorded traces to generate virtual traces and stacking together the virtual traces that share a same ray path to enhance signal-to-noise ratio of the virtual traces, a second step of convolving the virtual traces with the recorded traces to generate super-virtual traces having longer ray paths than the recorded traces, and stacking all super-virtual traces that share a same source and receiver points to further enhance signal-to-noise ratio of final super-virtual traces;

append the recorded traces with the enhanced final super-virtual traces to obtain a full set of calculated traces;

a moving mechanism to move the land streamer layout to another location on the ground surface and repeat processing steps to obtain another full set of calculated traces; and the processing circuitry further configured to identify subsurface geology for layers of rock at various spatial locations based on the calculated traces;

wherein for extrapolated traces having a signal-to noise ratio (SNR) below a SNR threshold, the processing circuitry further configured to perform Iterative Spectral Varying Interferometry (ISVI) after the extrapolation to enhance the SNR of the virtual traces, wherein the ISVI is such that the super-virtual traces are iteratively convolved with a previous iteration of super-virtual traces to generate super-virtual traces with higher SNR.

11. The system of claim 10, further comprising
a deconvolution filter to filter the virtual traces based on first arrival travel times.

12. The system of claim 11, wherein the processing circuitry is further configured to
mute signals in a vicinity of the first arrival travel times.

13. The system of claim 10, wherein the SNR threshold is 1 to 1.

14. The system of claim 10, wherein the land streamer layout is such that an offset between a first receiver and a source is 4 m.

15. The system of claim 10, further comprising a tow vehicle configured to tow the land streamer layout to another location on the ground surface.

16. The system of claim 10, further comprising
a plurality of seismic sources configured to apply a seismic signal, the plurality of seismic sources located at the ground surface and at offsets equal to length of the land streamer layout.

17. The system of claim 16, wherein the plurality of seismic sources are configured to apply both P- and S-wave signals.

18. The system of claim 10, wherein the surface geophones are receivers having a stabilizing arm that is substantially perpendicular to the land streamer to ensure lateral stability during data acquisition.

* * * * *